(12) United States Patent
Hassani et al.

(10) Patent No.: US 10,406,917 B2
(45) Date of Patent: Sep. 10, 2019

(54) SYSTEMS AND METHODS FOR VEHICLE CRUISE CONTROL SMOOTHNESS ADAPTATION

(71) Applicant: Ford Global Technologies, LLC, Dearborn, MI (US)

(72) Inventors: Ali Hassani, Ann Arbor, MI (US); Alexandra Taylor, Harbor Springs, MI (US); Nitendra Nath, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 15/688,636

(22) Filed: Aug. 28, 2017

(65) Prior Publication Data

US 2019/0061527 A1   Feb. 28, 2019

(51) Int. Cl.
| | | |
|---|---|---|
| *B60K 31/00* | (2006.01) | |
| *G06T 7/50* | (2017.01) | |
| *G06T 7/73* | (2017.01) | |
| *G06K 9/00* | (2006.01) | |
| *G06T 7/60* | (2017.01) | |

(52) U.S. Cl.
CPC ...... *B60K 31/0066* (2013.01); *B60K 31/0058* (2013.01); *G06K 9/00798* (2013.01); *G06K 2209/23* (2013.01); *G06T 7/50* (2017.01); *G06T 7/60* (2013.01); *G06T 7/73* (2017.01); *G06T 2207/30236* (2013.01); *G06T 2207/30256* (2013.01)

(58) Field of Classification Search
CPC .. B60K 31/0066; B60K 31/0058; G06T 7/50; G06T 7/73; G06T 7/60; G06K 9/00798
See application file for complete search history.

(56) References Cited

U.S. PATENT DOCUMENTS 8,332,151 B2   12/2012   Suganuma et al.
8,930,116 B2   1/2015   Filev et al.
(Continued)

FOREIGN PATENT DOCUMENTS

DE   102006001818 A1   7/2007
DE   102008019174 A1   10/2009
(Continued)

OTHER PUBLICATIONS

Khaled Sailan et al., *Modeling and Design of Cruise Control System with Feedforward for All Terrian Vehicles*, Siegen, Germany, 11 Pages.
(Continued)

*Primary Examiner* — Anne M Antonucci
*Assistant Examiner* — Renee LaRose
(74) *Attorney, Agent, or Firm* — Frank Lollo; Neal, Gerber & Eisenberg LLP; James P. Muraff

(57) ABSTRACT

Methods and systems are disclosed for vehicle cruise control smoothness adaptation. An example vehicle includes a GPS receiver for receiving expected road incline data, a camera for determining a half lane width position, and a radar for determining two respective leading vehicle angles of arrival. The vehicle also includes a processor for determining an actual road incline by filtering the expected road incline, half lane width position, and leading vehicle angles of arrival. And the processor is further for modifying a cruise control system based on the actual road incline.

17 Claims, 5 Drawing Sheets

(56) References Cited

U.S. PATENT DOCUMENTS

| | | | |
|---|---|---|---|
| 9,008,940 B2 | 4/2015 | Ueyama et al. | |
| 2011/0276216 A1* | 11/2011 | Vaughan | B60W 10/06 701/31.4 |
| 2016/0171315 A1* | 6/2016 | Yi | G06K 9/00791 382/154 |

FOREIGN PATENT DOCUMENTS

| | | | |
|---|---|---|---|
| JP | 2004317323 A | 11/2004 | |
| WO | WO 2016079117 A1 | 5/1916 | |
| WO | WO 2014149042 A1 | 9/2014 | |

OTHER PUBLICATIONS

Jaime Junell et al., *Robust Predictive Cruise Control for Commercial Vehicles*, International Journal of General Systems, 2013, pp. 776-792, 20 Pages.

* cited by examiner

SYSTEMS AND METHODS FOR VEHICLE CRUISE CONTROL SMOOTHNESS ADAPTATION

TECHNICAL FIELD

The present disclosure generally relates to vehicle adaptive cruise control and, more specifically, methods, systems, and devices for cruise control smoothness adaptation.

BACKGROUND

A typical vehicle may have an engine and brakes, which may be automatically controlled by a processor when the vehicle is in a "cruise control" mode. The processor may analyze data from one or more sensors to speed up, slow down, or maintain a given speed or distance between the vehicle and a leading vehicle. Vehicles may use cruise control in many situations, including on both flat terrain and terrain having an incline or decline.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments include systems and methods for automatically adjusting or smoothing an adaptive cruise control system of a vehicle. An example disclosed vehicle includes a GPS receiver for receiving an expected road incline data. The vehicle also includes a camera for determining a half lane width position, a radar for determining two respective leading vehicle angles of arrival, and a processor. The processor is configured for determining an actual road incline by filtering the expected road incline, half lane width position, and leading vehicle angles of arrival, and modifying a cruise control system based on the actual road incline.

An example disclosed method includes determining, by a vehicle processor, an expected road incline based on GPS data. The method also includes determining, by the vehicle processor, a half lane width position based on images captured by a camera. The method further includes determining, by the vehicle processor, two respective leading vehicle angles of arrival, based on data captured by a radar. The method still further includes determining, by the vehicle processor, an actual road incline by filtering the expected road incline, half lane width position, and leading vehicle angles of arrival. And the method yet further includes modifying a cruise control system based on the actual road incline.

Another example may include means for determining, by a vehicle processor, an expected road incline based on GPS data. The example may also include means for determining, by the vehicle processor, a half lane width position based on images captured by a camera. The example may further include means for determining, by the vehicle processor, two respective leading vehicle angles of arrival, based on data captured by a radar. The example may still further include means for determining, by the vehicle processor, an actual road incline by filtering the expected road incline, half lane width position, and leading vehicle angles of arrival. And the example may yet further include means for modifying a cruise control system based on the actual road incline.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
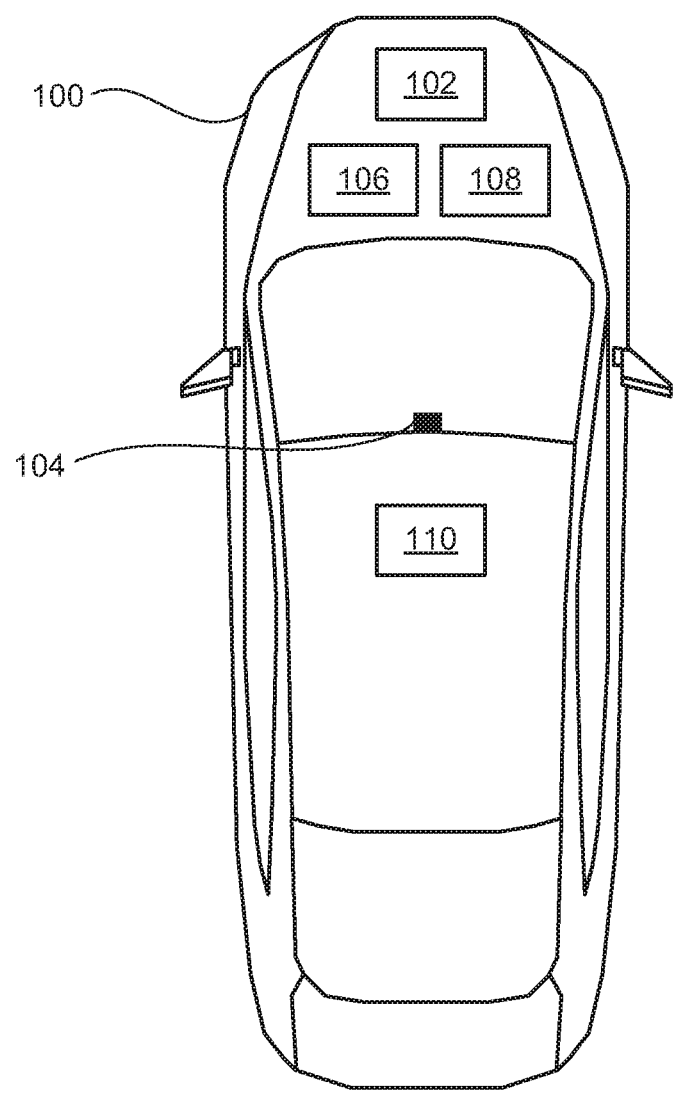
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles may include adaptive cruise control systems. These systems may provide drivers with a more convenient driving experience, by allowing the vehicle to automatically maintain a given speed or distance from a vehicle in front. Many systems maintain speed and/or distance by automatically increasing or decreasing the speed, where reducing the vehicle speed often includes applying the brakes.

In some situations, the cruise control may apply the brakes quickly or forcefully. This may be the case when the vehicle is travelling uphill or downhill, and a distance to a leading vehicle is rapidly reduced. This can result in an experience for the driver.

To provide a smoother adaptive cruise control, examples disclosed herein may include receiving data from one or more sensors, devices, or systems, and leveraging gravitational forces when travelling uphill and downhill to adjust a level or amount of braking applied. This may take the form of a feedforward control for the adaptive cruise control, in which the inputs are filtered using a kalman filter to determine an optimal braking function for the cruise control system. Examples disclosed herein may provide for smoother adjustment in vehicle speed and distance to a leading vehicle while the vehicle is travelling by using the determined braking function.

To carry out these actions and other described herein, an example vehicle may include a GPS receiver, a camera, a Radar, a processor, and a cruise control system. Data received from by the GPS receiver, camera, and Radar may be input into a kalman filter to provide feedforward control, such that a braking function can be determined and applied to the brakes of the vehicle while operating the cruise control.

FIG. 1 illustrates an example vehicle 100 according to embodiments of the present disclosure. Vehicle 100 may be a standard gasoline powered vehicle, a hybrid vehicle, an electric vehicle, a fuel cell vehicle, and/or any other mobility implement type of vehicle. Vehicle 100 may include parts related to mobility, such as a powertrain with an engine, a transmission, a suspension, a driveshaft, and/or wheels, etc. Vehicle 100 may be non-autonomous, semi-autonomous (e.g., some routine motive functions controlled by the vehicle 100), or autonomous (e.g., motive functions are controlled by vehicle 100 without direct driver input).

In the illustrated example, vehicle 100 includes a GPS receiver 102, a camera 104, a radar 106, a cruise control system 108, and a processor 110. Vehicle 100 may also include one or more components described below with respect to FIG. 2.

The GPS receiver 102 may include one or more antennas and/or processors for determining a location of vehicle 100. GPS receiver 102 may also receive and store a topographical map, which may include elevation changes, road grades, path or route information, terrain data, and other topographical or route-based data. GPS receiver 102 may combine the determined location of vehicle 100 with a predicted direction of movement, and responsively determine an expected change in elevation based on the location, speed, direction, etc. of vehicle 100. This may be done by determining the location of vehicle 100, and comparing the determined location to data from the topographical map. As such, GPS receiver 102 may determine an expected road incline of a road in the direction of movement of vehicle 100. It should be understood that the expected road incline may be positive (i.e., an uphill section of road is approaching), negative (i.e., a downhill section of road is approaching), or zero (i.e., a flat section of road is approaching).

The camera 104 may have a single lens or multiple lenses. In some examples, camera 104 may be a stereotactic camera, and may be used by vehicle 100 for the purpose of lane keeping while the vehicle is in motion. For instance, camera 104 may capture images of the road in front of vehicle 100 (and as such may be aimed or directed forward), and may determine a placement of the vehicle horizontally within a given lane of the road. This may be done by determining a distance to an inside road marking line and an outside road marking line, and determining whether a position of vehicle 100 is within this area.

Camera 104 may also be configured to determine a half-lane width position, which may be defined as a vertical position of a point at which the road lane is half the width of a position in front of the vehicle. In other words, the camera may determine a vertical distance on an image between two points, wherein the first point corresponds to a lane width that is twice as wide as a second point. This is described in further detail below with respect to FIG. 3.

In some examples, a camera for a vehicle approaching an uphill sloping road may determine that the position of the half lane width is higher than for a corresponding situation in which the vehicle is approaching a downhill sloping road. As such, the position of the half-lane width may correspond to the incline of the road in front of vehicle 100.

Radar 106 may be configured to transmit and receive signals corresponding to one or more leading vehicles, or vehicles travelling in front of vehicle 100. Vehicle 100 may have one or more systems or devices configured to track the position, elevation, location, lane, and other characteristics of vehicles surrounding vehicle 100. One such data signal may include an angle of arrival corresponding to each vehicle. The angle of arrival may include a horizontal component and a vertical component, corresponding respectively to a horizontal displacement and vertical displacement of the leading vehicle to which it corresponds. As such, vehicle 100, through the use of radar 106, may be configured to determine a horizontal and vertical position of one or more leading vehicles. Where two leading vehicles are present, a difference in the vertical angles of arrival for each leading vehicle may correspond to an uphill or downhill approaching road section. This is described in more detail with respect to FIG. 4.

Cruise control system 108 may be configured to speed up, slow down, and/or maintain a given vehicle speed. Further, cruise control system 108 may be configured to increase, decrease, and/or maintain a set distance from a leading vehicle. In order to accomplish these tasks, the cruise control system 108 may control the vehicle engine and/or vehicle brakes.

In some examples, the cruise control system 108 may include a braking function, which may be used to determine an length, intensity, or other characteristic of brake to apply. For instance, if vehicle 100 is set to maintain a speed of 65 MPH, and the vehicle travels down a hill thereby increasing the speed, the cruise control system 108 may apply the brakes to slow down the vehicle to maintain a speed of 65 MPH.

The braking function may be generated by cruise control system 108, and may take into account variables such as the current speed, acceleration, distance to a leading vehicle or following vehicle (e.g., a vehicle behind vehicle 100), as well as a predicted or expected road slope and an actual road slope. An output of the braking function may inform the cruise control system when and how forcefully to apply the brakes.

Processor 110 may be configured to receive inputs from various sensors, devices, and systems, and make one or more determinations. For instance, processor 110 may take data from the GPS receiver 102, camera 104, and radar 106, and determine an actual road incline by filtering the expected road incline determined by the GPS receiver, the half lane width position determined by the camera, and the leading vehicle angles of arrival determined by the radar. The filter may be a kalman filter, which may factor in a history of various data points and data sources to provide a better estimation of an actual road incline in front of vehicle 100.

In some examples, a kalman filter may be used to compare predicted values to historical data. As such, the processor may receive current GPS data, camera data, and/or radio data, and may compare that data to historical data. The comparison may be used to determine an actual road slope with a high degree of confidence.

Processor 110 may then modify the cruise control based on the determined actual road incline. This may include generating or modifying the braking function, modifying an engine parameter, or changing a vehicle speed or acceleration, for example. In one example, processor 110 may change a braking force based on the actual road incline, such that the braking force is lowered when the incline is positive, and the braking force is increased when the incline is negative. Other examples are possible as well.

In some examples, modifying the cruise control system may include modifying a braking force based on the actual road incline. For instance, the vehicle may ordinarily apply a given brake force based on the current vehicle speed, the current headway distance to the nearest leading vehicle, and the set cruise control speed. However when the actual road incline is large, the braking force applied may be reduced. Alternatively, if the actual road incline is negative (i.e., a downhill slope), a braking force applied may be increased.

In some examples, modifying the cruise control system may include modifying the braking force based on the actual road incline and a determined headway distance between the vehicle and a leading vehicle in front of the vehicle.

Figure 2:
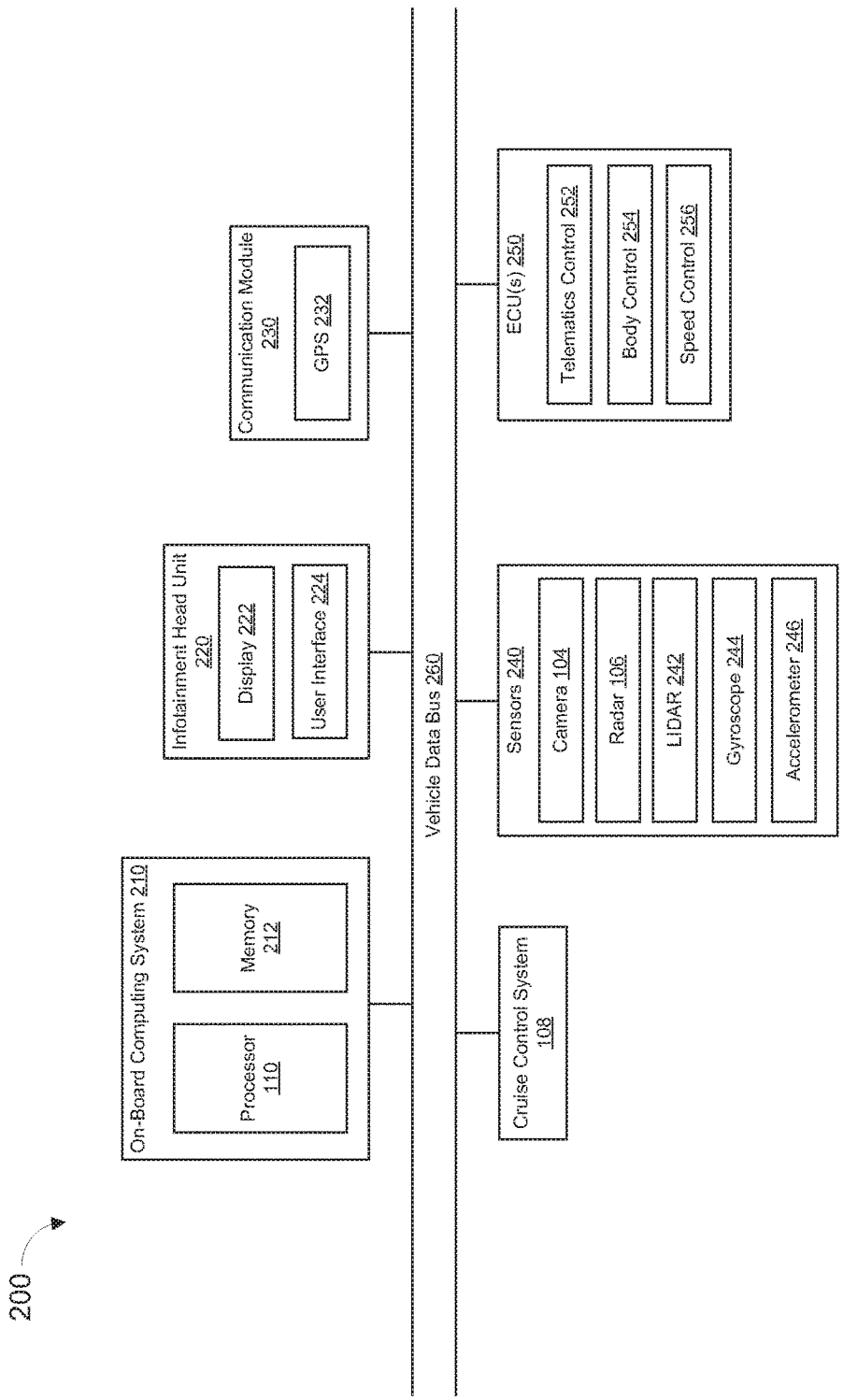
FIG. 2 illustrates a simplified block diagram of electronic components of the vehicle of FIG. 1.

FIG. 2 illustrates an example block diagram 200 showing electronic components of vehicle 100, according to some embodiments. In the illustrated example, the electronic components 200 include cruise control system 108, an on-board computing system 210, infotainment head unit 220, communications module 230, sensors 240, electronic control unit(s) 250, and vehicle data bus 260.

The on-board computing system 210 may include a microcontroller unit, controller or processor 110 and memory 212. The processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor and/or memory with on-board computing system 210. Additionally, the infotainment head unit 220 may display the infotainment system on, for example, a center console display of vehicle 100.

Communication module 230 may include wired or wireless network interfaces to enable communication with external networks, devices, or systems. For example, communications module 230 may include a GPS system 232 (which may be similar or identical to GPS receiver 102) having one or more antennas configured to receive data for determining a vehicle location. Communications module 230 may also include hardware (e.g., processors, memory, storage, antenna, etc.) and software to control the wired or wireless network interfaces. In the illustrated example, communications module 230 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, communications module 230 may include a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

Sensors 240 may be arranged in and around vehicle 100 to monitor properties of vehicle 100 and/or an environment in which the vehicle 100 is located. One or more of sensors 240 may be mounted on the outside of vehicle 100 to measure properties around an exterior of the vehicle 100. For instance, one or more antennas may be positions around an outside of vehicle 100 in order to receive signals from one or more devices and to determine a location of the device. Additionally or alternatively, one or more of sensors 240 may be mounted inside a cabin of vehicle 100 or in a body of vehicle 100 (e.g., an engine compartment, wheel wells, etc.) to measure properties in an interior of the vehicle 100. For example, sensors 240 may include accelerometers, odometers, tachometers, pitch and yaw sensors, wheel speed sensors, microphones, tire pressure sensors, biometric sensors and/or sensors of any other suitable type.

For example, sensors 240 may include camera 104 and radar 106. Sensors 240 may also include a light imaging detection and ranging (LIDAR) sensor 242, a gyroscope 244, and an accelerometer 246.

LIDAR sensor 242 may be configured to determine a topographical makeup of the area in front of vehicle 100. In some environments, GPS information, lane markings, and/or leading vehicles may not be available to the vehicle. For instance, where the vehicle is travelling around a corner, on a dirt road, or in heavy snow. In these situations, LIDAR 242 may provide map information which may be used to determine an actual road incline.

Data from the LIDAR sensor may be used instead of other data sources (i.e., GPS, Camera, or radar), or may be used to supplement those sources. When a road slope value cannot be calculated with sufficient confidence by the GPS, camera, and radar, the vehicle may query the AV (autonomous vehicle) cloud. The AV cloud may include slope measurements collected by other vehicles that may have travelled along the same route as the current vehicle. The current vehicle will fuse available data, such as GPS with lane position and traffic sign recognition (if visibility permits), to broadcast its location with as much precision as possible. The AV cloud would then estimate the road slope using pre-recorded lane and terrain data via LIDAR, and transmit the estimated road slope to the vehicle. If a road slope value has already been pre-determined based off a previous query, that value may be immediately used instead. Processing and data transmit time would be taken into account; i.e. the slope for the vehicle's anticipated would be broadcasted by estimating trajectory based on current velocity and anticipated time delay.

In some examples, processing may be performed entirely or for the most part by the AV cloud, to minimize the use of network data usage. AS such, the AV cloud may only send a road slope value to the vehicle rather than a full map.

The gyroscope 244 and accelerometer 246 may provide data to processor 110 corresponding to the vehicle speed, acceleration, and orientation. These sensors may be inertial sensors, which may provide data to be used by processor 110 as initial or starting data when applying the kalman filter. In some examples, the processor may determine the actual road incline based on data received from the inertial sensors.

The ECUs 250 may monitor and control subsystems of vehicle 100. Additionally, ECUs 250 may communicate properties (such as, status of the ECU 250, sensor readings, control state, error and diagnostic codes, etc.) to and/or receive requests from other ECUs 250, on-board computing platform 210, and/or processor 110. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the speed control unit 256.

The telematics control unit 252 may control tracking of the vehicle 100, for example, using data received by the GPS 232, communication module 230, and/or one or more sensors 240. The body control unit 254 may control various subsystems of the vehicle 100. For example, the body control unit 254 may control power a trunk latch, windows, power locks, power moon roof control, an immobilizer system, and/or power mirrors, etc. The speed control unit 256 may transmit and receive one or more signals via data bus 260, and may responsively control a speed, acceleration, or other aspect of vehicle 100.

Vehicle data bus 260 may include one or more data buses that communicatively couple the cruise control system 108, on-board computing system 210, infotainment head unit 220, communication module 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7).

Figure 3:
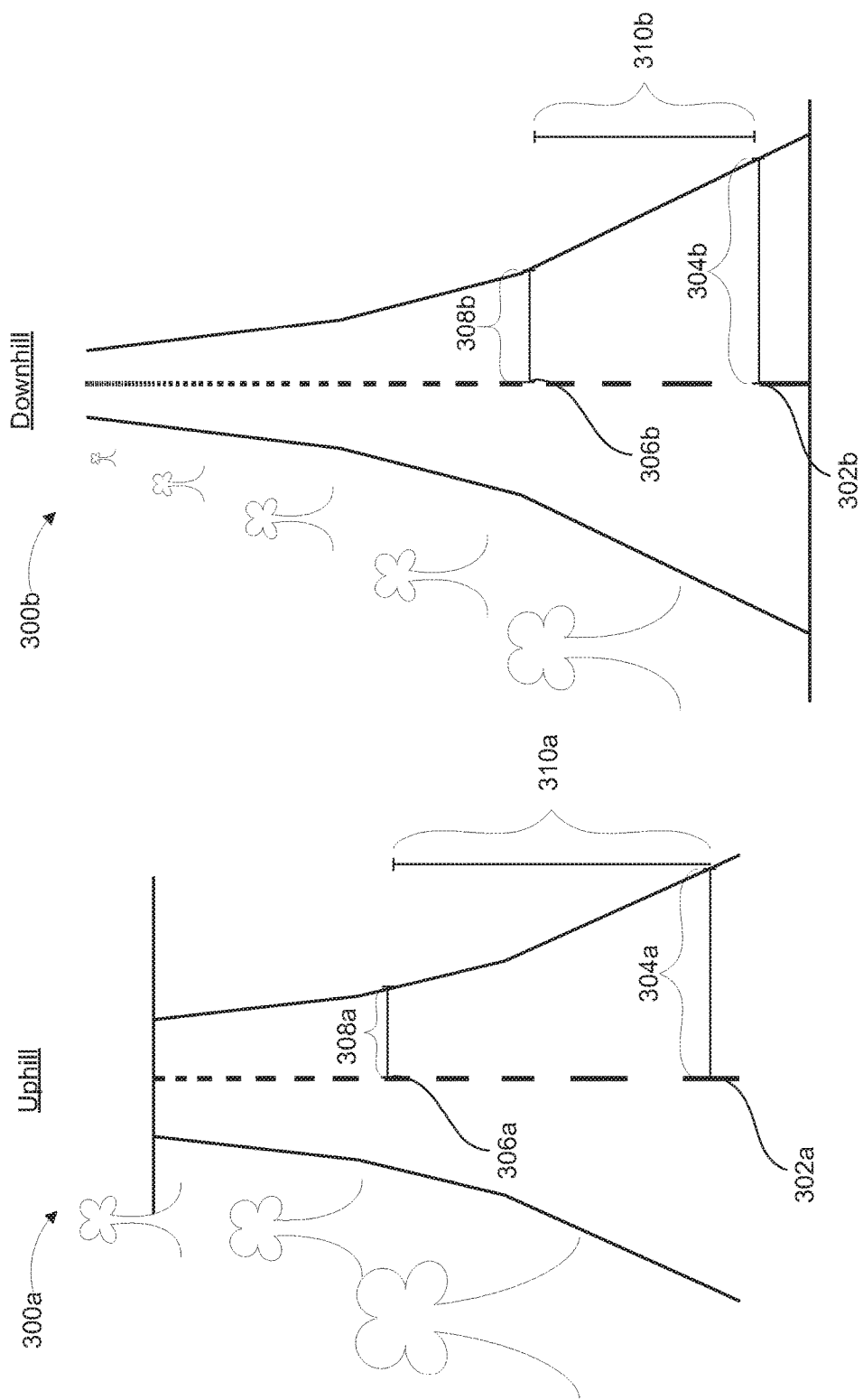
FIG. 3 illustrates two perspective views of a road, for which respective land half width positions are determined.

FIG. 3 illustrates two perspective views (300a and 300b) captured by a vehicle camera for which respective half lane width positions are determined. Views 300a and 300b may reflect images captured by a camera such as camera 104 corresponding to an uphill section and a downhill section respectively. The respective half lane width positions for each view may be defined as a vertical distance (310a and 310b) between a position in front of the vehicle and a position further down the road. The camera may be positioned on a front facing area of the vehicle, such that the field of view encompasses an area proximate the immediate front of the vehicle extending forward.

Beginning with view 300a, the camera may capture an image of the uphill section immediately in front of the vehicle. The processor may analyze or process the image, and based on the image determine the half lane width position. To do this, the processor may determine a first vertical position 302a corresponding to an area proximate a front of the vehicle. The processor may then determine a first lane width 304a corresponding the first vertical position 302a. The processor may then determine a second vertical position 306a corresponding to a second lane width 308a, wherein the second lane width 308a is half the size of the first lane width 304a. Then, the processor may determine the half lane width position based on the second vertical position 306a.

In some examples, the half lane width position may be the second vertical position 308a. In other examples, the half lane width position may be a value defined as length 310a (i.e., the difference between the first vertical position 302a and the second vertical position 306a). Length 310a may be larger for a section of road that is uphill than for one that is downhill.

View 300b illustrated an image captured by the camera of a downhill portion of road. To determine the half lane width position in this situation, the processor may determine the first vertical position 302b corresponding to an area proximate a front of the vehicle. The processor may then determine a first lane width 304b corresponding the first vertical position 302b. The processor may then determine a second vertical position 306b corresponding to a second lane width 308b, wherein the second lane width 308b is half the size of the first lane width 304b. Then, the processor may determine the half lane width position based on the second vertical position 306b. As such, the half lane width position may be the second vertical position 308b or the length 310b.

In some examples, the vertical positions and lane widths may be determined or measured in pixels. As such, the pixel position of various features shown in images captured by the camera may be used to determine the half lane width position, which in turn may be used to determine the road incline.

Figure 4:
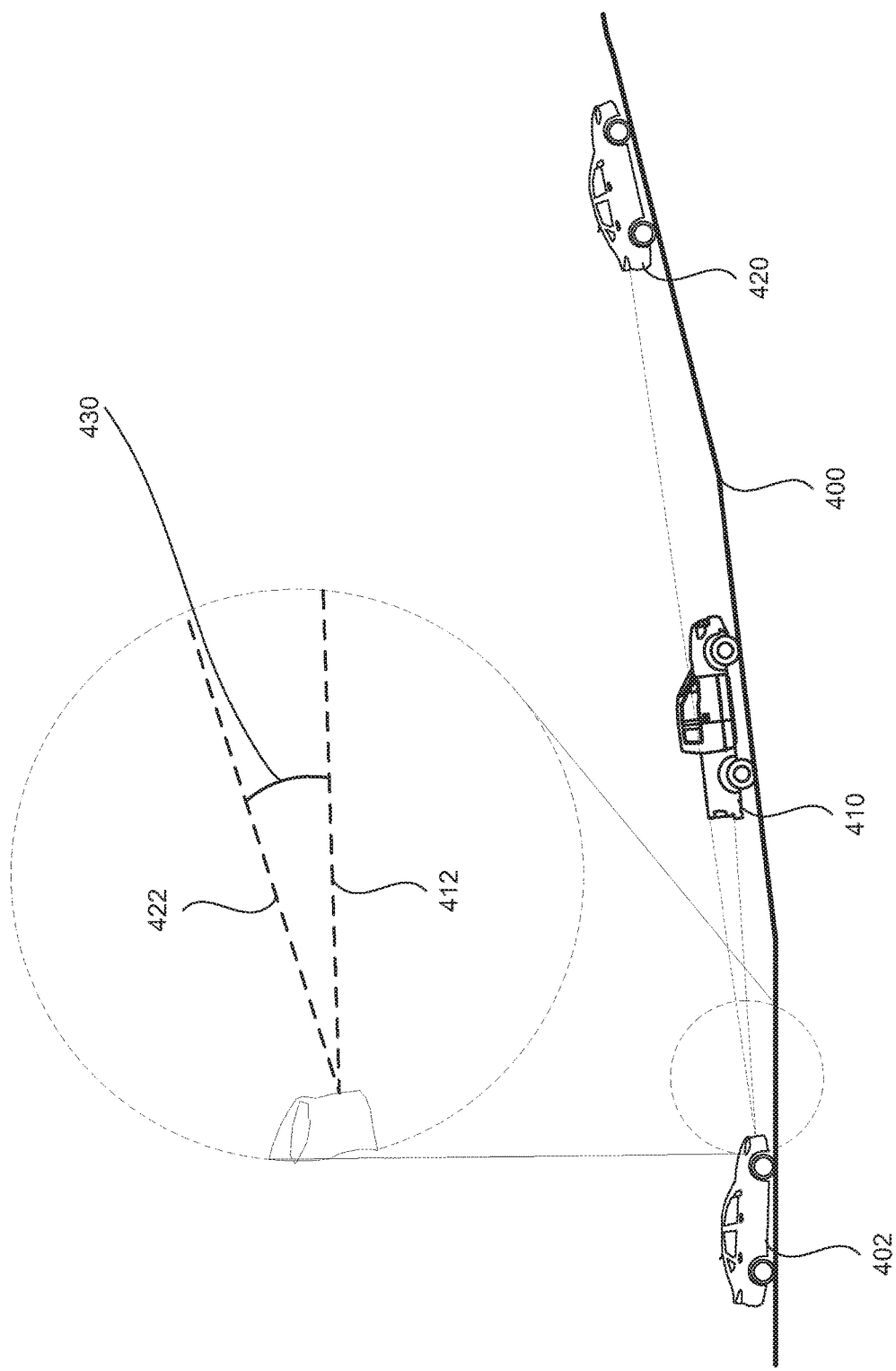
FIG. 4 illustrates a side perspective view of an inclined road having three vehicles, according to embodiments of the present disclosure.

FIG. 4 illustrates a side perspective view of an inclined road 400 having three vehicles thereon (402, 410, and 420), according to embodiments of the present disclosure. FIG. 4 helps illustrate how a radar, such as radar 106, may be used to determine a road incline through the use of angles of arrival of leading vehicles.

In FIG. 4, vehicle 402 may have a radar which can transmit and/or receive data to track one or more leading vehicles. The radar may be configured to determine an angle of arrival of a signal corresponding to each leading vehicle. FIG. 4 shows a first leading vehicle 410, and a first signal 412 received by the radar of vehicle 402. Second leading vehicle may correspond to a second signal 422 received by the radar of vehicle 402. The angles of arrival of signals 412 and 422 may be compared, and a difference 430 may be determined. A flat surface may result in very similar angles of arrival, while an uphill or inclined road may correspond to a higher first angle of arrival than the second angle of arrival, while a downhill road may correspond to a lower first angle of arrival than second angle of arrival.

In some examples, the first and second angle of arrival may be determined with respect to the surface on which vehicle 402 rests. For instance, a horizontal signal may correspond to an angle of zero.

In some examples, the rate of change of the angles of arrival may be determined. For instance, the difference 430 between the first and second angles of arrival may be monitored over time. An increasing difference may correspond to an increasingly inclined road, while a decrease in the difference 430 may correspond to a flattening out of the road, cresting of a hill, or other such topographical change. The rate of change of the difference between the first angle of arrival and the second angle of arrival may be used to determine the actual road incline.

Figure 5:
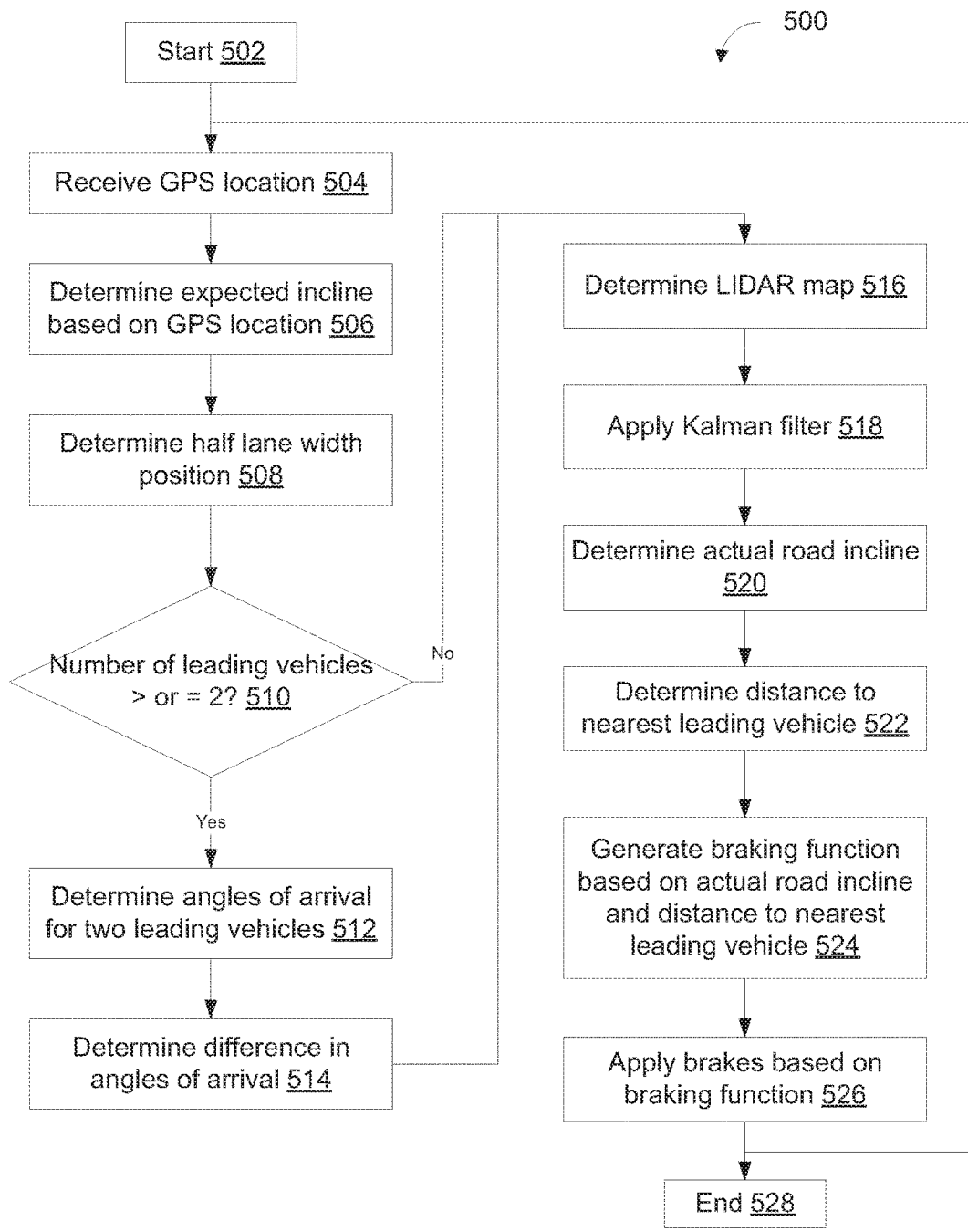
FIG. 5 illustrates a flowchart of an example method according to embodiments of the present disclosure.

FIG. 5 illustrates a flowchart of an example method 500 according to embodiments of the present disclosure. Method 500 may enable a vehicle to adjust or modify the cruise control system to smooth out the braking, accelerating, and more. The flowchart of FIG. 5 is representative of machine readable instructions that are stored in memory (such as memory 212) and may include one or more programs which, when executed by a processor (such as processor 110) may cause vehicle 100 to carry out one or more functions described herein. While the example program is described with reference to the flowchart illustrated in FIG. 5, many other methods for carrying out the functions described herein may alternatively be used. For example, the order of execution of the blocks may be rearranged, blocks may be changed, eliminated, and/or combined to perform method 500. Further, because method 500 is disclosed in connection with the components of FIGS. 1-4, some functions of those components will not be described in detail below.

Method 500 may start at block 502. At block 504, method 500 may include receiving a GPS location. This may include receiving data via one or more GPS antennas, and determining a vehicle location based on this data. The vehicle may also receive a topographical map, which may include information related to road inclines, hills, mountains, elevation changes, and more.

Block 506 of method 500 may include determining an expected incline based on the GPS location. This may take into account a current position, acceleration, speed, orientation, and other characteristics of the vehicle. The location and other data corresponding to the vehicle may be compared to the topographical map, and an expected incline may be determined. The expected incline may include an incline determined for a section of road immediately in the path of the vehicle, determined while the vehicle is in motion. In some examples, the expected incline may include a plurality of expected inclines for two or more sections of road on a path or route planned for the vehicle. The vehicle may have a route planned that covers a large section of road, and the topographical map may be analyzed to determine the incline of the road at two or more locations along the route, for example.

At block 508, method 500 may include determining a half lane width position. The half lane width position may be a vertical position or distance between a first point and a second point, wherein a lane width at the second point is half of the lane width at the first point. This is due to the fact that as a lane extends away from the vehicle, an image including the lane will show the lane wider at a location near the vehicle and narrower at a location farther away from the vehicle. Where the road experiences an incline, the location at which the lane is half the width will be higher in the image, than a corresponding location for an image of a road experiencing a decline. This distinction may be used to determine whether the road is going up or going down.

At block 510, method 500 may include determining whether a number of leading vehicles is greater than or equal to two. Where there are two or more vehicles, the angles of arrival of signals corresponding to each vehicle may be determined at block 512. The angle of arrival for a given leading vehicle may correspond to a tracking signal used to monitor one or more characteristics of the leading vehicle. This data may be used to maintain a safe distance by the cruise control.

At block 514, method 500 may include determining a difference in the angles of arrival of the two leading vehicles. Where the road is inclined upward, the two leading vehicles may be at different elevations, causing the angle of arrival of each signal to be different. A difference between two angles of arrival may correspond to an amount of slope or a gradient in the road.

At block 516, method 500 may optionally include determining a LIDAR map. The LIDAR map may be determined by one or more vehicles, having LIDAR systems mounted thereon. The LIDAR map may include a topographical representation of an area surrounding the vehicle and extending outward. In some examples, the method may include transmitting the vehicle location to a cloud based computing device. The cloud based computing device may then determine based on the location, an expected or predicted slope of the road, and may respond to the vehicle with this information.

At block 518, method 500 may include filtering the data, by applying a kalman filter. In some examples, the kalman filter may be applied to the expected road incline determined using the GPS location, the determined half lane width position, and the leading vehicle angles of arrival. Further, the kalman filter may be applied to the LIDAR map and/or expected road incline received from the could based computing device.

The filtered data may then be used at block 520 to determine an actual road incline. The cruise control system may be modified based on the actual road incline.

At block 522, method 500 may include determining a distance to the nearest leading vehicle. This may be the nearest leading vehicle that is in the same lane or path as the vehicle, and may be termed as a "headway distance."

At block 524, method 500 may include generating a braking function based on the actual road incline and distance to the nearest leading vehicle. The braking function may be a polynomial or logistic function (i.e., not a step function) and may tell the vehicle when and how forcefully to apply the brakes to maintain a given speed or distance from the leading vehicle. At block 526, method 500 may include applying the vehicle brakes based on the braking function. For instance, if the road slope is increasing, the brakes may be applied less than if the road slope is decreasing. Method 500 may then end at block 528.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment (s) without substantially departing from the spirit and principles of the techniques described herein. All modifications are intended to be included herein within the scope of this disclosure and protected by the following claims.

system based on the actual road incline.

What is claimed is:

1. A vehicle comprising:
   a GPS receiver for receiving expected road incline data;
   a camera for determining a half lane width position;
   a radar for determining two respective leading vehicle angles of arrival; and
   a processor for:
   determining an actual road incline by filtering the expected road incline data, half lane width position, and leading vehicle angles of arrival; and
   modifying a cruise control system based on the actual road incline,
   wherein determining the two respective leading vehicle angles of arrival comprises:
   determining a first angle of arrival of a first signal corresponding to a first leading vehicle;
   determining a second angle of arrival of a second signal corresponding to a second leading vehicle; and
   determining a rate of change based on a difference between the first angle of arrival and the second angle of arrival over time.

2. The vehicle of claim 1, wherein the camera comprises a stereotactic camera, and wherein determining the half lane width position comprises:
   capturing an image of a field of view in front of the vehicle, and based on the image:
   determining a first vertical position corresponding to an area proximate a front of the vehicle;
   determining a first lane width corresponding the first vertical position; and
   determining a second vertical position corresponding to a second lane width, wherein the second lane width is half a size of the first lane width; and
   determining the half lane width position based on the second vertical position.

3. The vehicle of claim 2, wherein the first lane width and the second lane width are measured in pixels.

4. The vehicle of claim 1, wherein the processor is further for determining the actual road incline by filtering the rate of change.

5. The vehicle of claim 1, wherein the processor is further for determining the actual road incline by applying a kalman filter to the expected road incline data, half lane width position, and leading vehicle angles of arrival.

6. The vehicle of claim 1, wherein the processor is further for generating a braking function based on the actual road incline, wherein modifying the cruise control system comprises activating vehicle brakes based on the braking function.

7. The vehicle of claim 1, further comprising an inertial sensor, wherein the processor is further for determining the actual road incline based on data received from the inertial sensor.

8. The vehicle of claim 1, further comprising a LIDAR sensor for generating a LIDAR map of an area proximate the vehicle, wherein the processor is further for determining the actual road incline based on the LIDAR map.

9. A vehicle comprising:
   a GPS receiver for receiving expected road incline data;
   a camera for determining a half lane width position;
   a radar for determining two respective leading vehicle angles of arrival; and
   a processor for:
   determining an actual road incline by filtering the expected road incline data, half lane width position, and leading vehicle angles of arrival; and
   modifying a cruise control system based on the actual road incline, wherein modifying the cruise control system comprises modifying a braking force based on the actual road incline and a determined headway distance to a leading vehicle.

10. A method comprising
    determining, by a vehicle processor, an expected road incline based on GPS data;
    determining, by the vehicle processor, a half lane width position based on images captured by a camera;
    determining, by the vehicle processor, two respective leading vehicle angles of arrival, based on data captured by a radar;
    determining, by the vehicle processor, an actual road incline by filtering the expected road incline, half lane width position, and leading vehicle angles of arrival; and
    modifying a cruise control system based on the actual road incline,
    wherein determining the two respective leading vehicle angles of arrival comprises:
    determining a first angle of arrival of a first signal corresponding to a first leading vehicle;
    determining a second angle of arrival of a second signal corresponding to a second leading vehicle; and
    determining a rate of change based on a difference between the first angle of arrival and the second angle of arrival over time.

11. The method of claim 10, wherein the camera comprises a stereotactic camera, and wherein determining the half lane width position comprises:
    capturing an image of a field of view in front of the vehicle, and based on the image:
    determining a first vertical position corresponding to an area proximate a front of the vehicle;
    determining a first lane width corresponding the first vertical position; and
    determining a second vertical position corresponding to a second lane width, wherein the second lane width is half a size of the first lane width; and
    determining the half lane width position based on the second vertical position, wherein the first lane width and the second lane width are measured in pixels.

12. The method of claim 10, further comprising determining the actual road incline by filtering the rate of change.

13. The method of claim 10, wherein determining the actual road incline comprises applying a kalman filter to the expected road incline, half lane width position, and leading vehicle angles of arrival.

14. The method of claim 10, wherein modifying the cruise control system comprises modifying a braking force based on the actual road incline and a determined headway distance to a leading vehicle.

15. The method of claim 10, further comprising:
generating a braking function based on the actual road incline, wherein modifying the cruise control system comprises activating vehicle brakes based on the braking function.

16. The method of claim 10, further comprising:
determining, by the vehicle processor, the actual road incline based on data received from an inertial sensor.

17. The method of claim 10, further comprising:
generating, by a LIDAR sensor, a LIDAR map of an area proximate the vehicle; and
determining the actual road incline based on the LIDAR map.

* * * * *